United States Patent
Bentley et al.

[11] Patent Number: 6,161,308
[45] Date of Patent: Dec. 19, 2000

[54] SLIMES TREATMENT

[76] Inventors: Michael David Bentley, 6 Lawrence Street, Farrarmere, Benoni; Ashley Gary McLeod, 10 Plein Street, Vredendal, Western Cape; Nceba Aubrey Mjacu, 37 Riesling Avenue, Lutzville, all of South Africa

[21] Appl. No.: 09/271,976

[22] Filed: Mar. 19, 1999

[30] Foreign Application Priority Data

Mar. 20, 1998 [ZA] South Africa ............................ 98/2396

[51] Int. Cl.⁷ ........................................ F26B 7/00
[52] U.S. Cl. ........................... 34/380; 210/800; 210/807; 34/60
[58] Field of Search ................................... 210/290, 291, 210/747, 800, 807, 42, 83, 64, 44, 46, 55, 84; 34/380, 397, 60, 61, 69

[56] References Cited

U.S. PATENT DOCUMENTS

| | | |
|---|---|---|
| 3,622,087 | 11/1971 | Oltmann ..................................... 241/62 |
| 3,680,698 | 8/1972 | Liu et al. ................................... 210/46 |
| 3,707,523 | 12/1972 | Ledden et al. . |
| 3,718,003 | 2/1973 | Cook et al. . |
| 3,761,239 | 9/1973 | Cook et al. . |
| 3,763,041 | 10/1973 | Cook et al. ................................ 210/42 |
| 3,978,673 | 9/1976 | Schleede . |
| 4,036,752 | 7/1977 | Lassiter, Sr. . |
| 4,235,562 | 11/1980 | Ribas . |
| 4,247,430 | 1/1981 | Constien . |
| 4,312,761 | 1/1982 | Gitchel .................................... 210/747 |
| 4,441,840 | 4/1984 | Bassier et al. . |
| 4,611,951 | 9/1986 | Sapp . |
| 4,665,988 | 5/1987 | Murphey et al. . |
| 4,770,708 | 9/1988 | Atkins et al. . |
| 4,808,304 | 2/1989 | Deal ....................................... 210/170 |
| 4,931,190 | 6/1990 | Laros ..................................... 210/710 |
| 5,106,422 | 4/1992 | Bennett et al. . |
| 5,167,821 | 12/1992 | Tanbo et al. . |
| 5,310,285 | 5/1994 | Northcott . |
| 5,449,464 | 9/1995 | El-Shall ................................... 210/727 |

FOREIGN PATENT DOCUMENTS

| | | |
|---|---|---|
| 653 891 | 8/1993 | Australia . |
| B-33750/93 | 8/1993 | Australia ........................ C02F 11/12 |
| 877 079 | 10/1981 | Russian Federation . |

*Primary Examiner*—Denise L. Ferensic
*Assistant Examiner*—Michelle A Mattera
*Attorney, Agent, or Firm*—Burns, Doane, Swecker & Mathis, LLP

[57] ABSTRACT

The invention relates to a method of producing a thickened slimes fraction blended with a tailing fraction for delivery to a discharge or disposal point (38). The method includes the steps of forming a bed of tailings fraction on a de-watering screen (28) and delivering a thickened slimes fraction onto the bed of tailings fraction. The slimes fraction (30) is then allowed to de-water through the bed and the screen.

3 Claims, 2 Drawing Sheets

SLIMES TREATMENT

BACKGROUND OF THE INVENTION

This invention relates to slimes treatment.

In mineral sands operations throughout the world, the removal of fine clay material, commonly called slimes, is necessary prior to the gravimetric concentration of the heavy minerals in the primary concentration stage. Although the removal of the slimes is readily achieved, and concentration of the slimes can be achieved in a thickener, the disposal of the thickened slimes remains a problem.

Various attempts have been made to co-deposit the slimes with the coarse tailings stream, but to date, no effective method has been demonstrated. This is partly due to the fact that the tailings are typically conveyed to the point of deposition in a slurry form and the water run-off assists in removing the slimes from the deposition point.

As the industry depletes more and more of the better mineral sands ore reserves, there is a need to exploit some of the reserves previously considered uneconomic. In many cases, the main hinderance to exploitation of these reserves is the high slimes content—in some cases over 25% of the in situ ore is slimes.

SUMMARY OF THE INVENTION

According to the invention there is provided a method of producing a thickened slimes fraction blended with a tailings fraction for delivery to a discharge or disposal point, the method comprising the steps of:

providing a thickened slimes fraction;

providing a tailings fraction;

forming a bed of the tailings fraction on a de-watering screen;

delivering the thickened slimes fraction onto the bed of tailings fraction and allowing the slimes fraction to de-water through the bed and the screen.

Preferably, the tailing fraction is de-watered prior to it being introduced onto the de-watering screen.

DESCRIPTION OF EMBODIMENTS

The invention provides an effective method of blending a thickened slimes fraction with a tailings fraction to produce a blended product which can be delivered to a discharge or deposition point. More particularly, the blended product can be returned to a mining excavation for use as backfill.

The thickened slimes fraction will be produced in a suitable thickener. Some of the tailings fraction may be added to the thickener. The thickener may be any known in the art such as a cylindrical continuous gravity thickener fitted with rotating rakes, a de-coned thickener and the like. The preferred thickener is a high density thickener such as that sold under the trade mark Ultrasep®.

Figure 1:
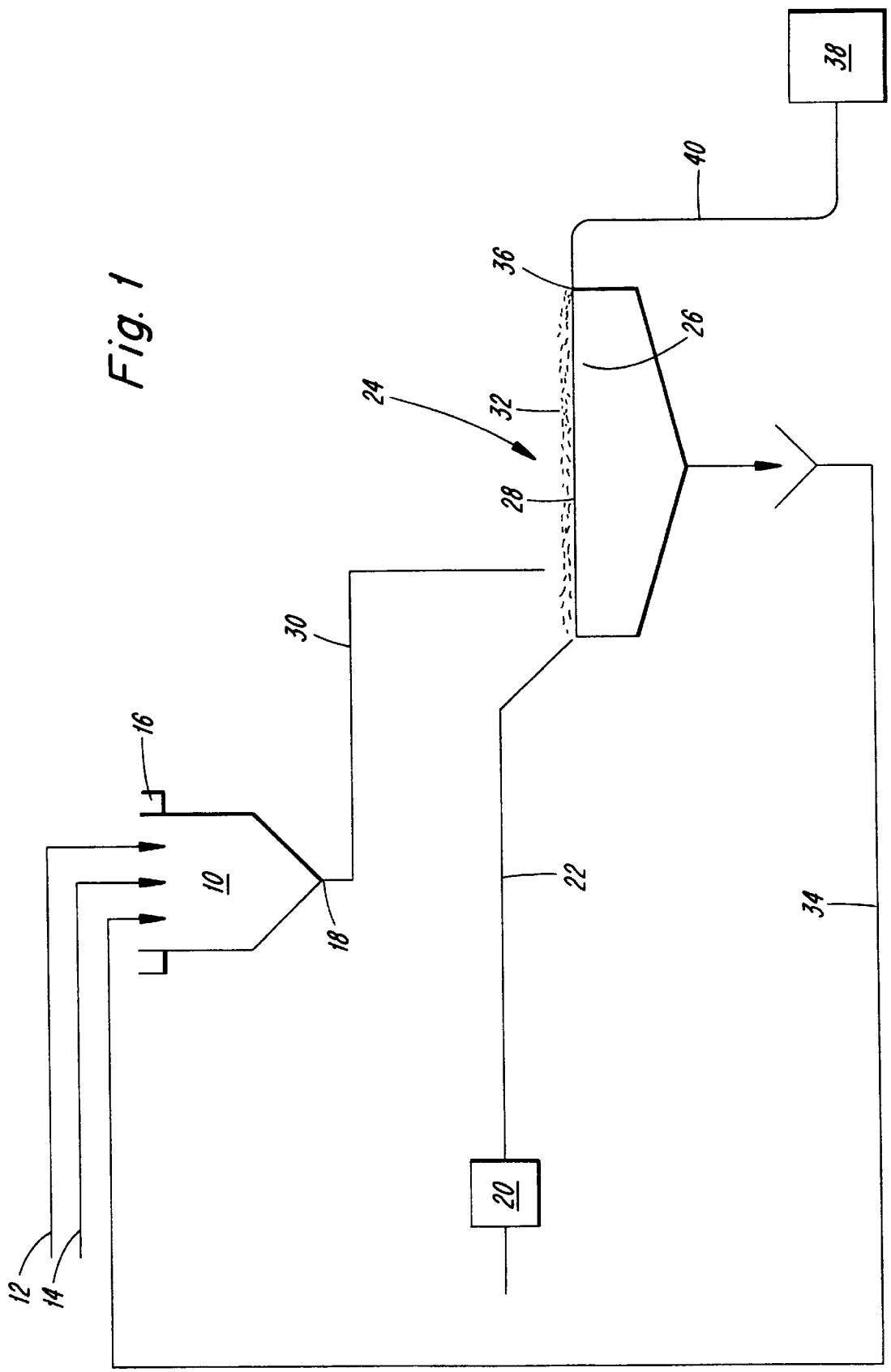
FIG. 1 is a flow diagram of an embodiment of the invention.

An embodiment of the invention will now be described with reference to FIG. 1 of the accompanying drawings. A mineral sand is subjected to a gravimetric concentration producing a slimes fraction and a heavy fraction containing the valuable minerals. The slimes fraction is introduced into a thickener 10 along line 12. The heavy fraction is subjected to a further concentration stage to produce a fraction containing the valuable minerals and a tailings fraction. Some of the tailings fraction is introduced along the line 14 into the thickener 10. The mixture of slimes and tailings is treated in known manner in the thickener 10 producing a thickener underflow and water. The water overflows into launder 16 and may be recycled to the gravimetric concentration stage. The thickener underflow is discharged through outlet 18.

Figure 2:
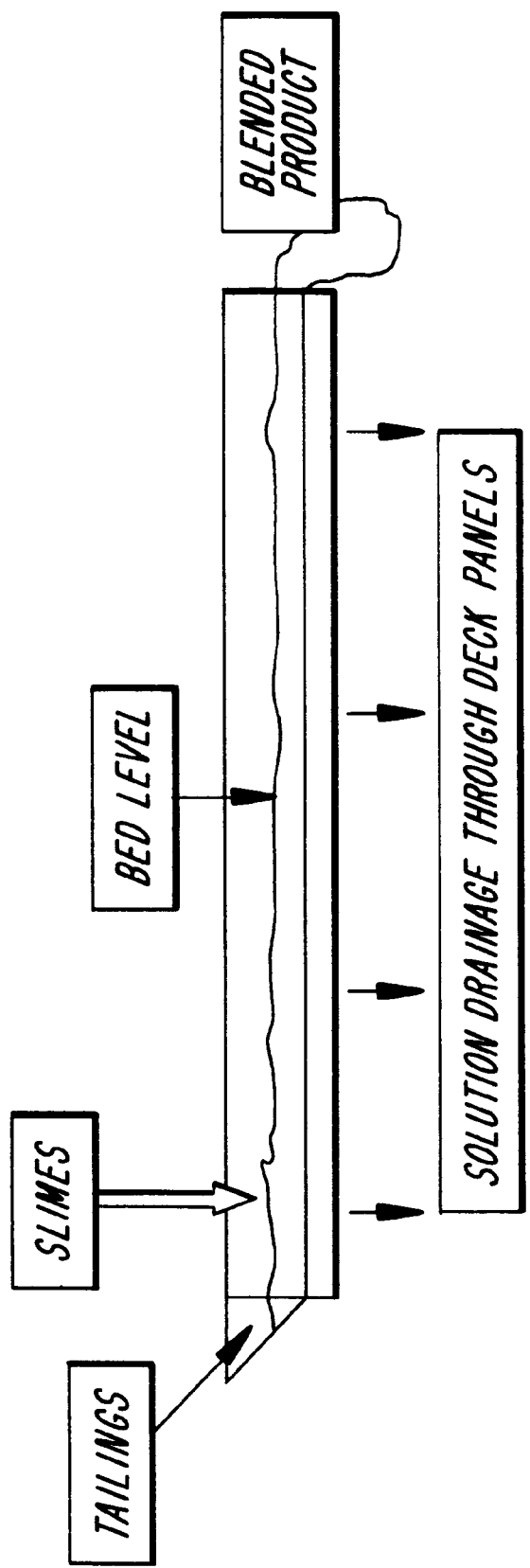
FIG. 2 is a diagrammatic representation of the de-watering screen depicted in FIG. 1.

Some of the tailings fraction from the concentration stage mentioned above is de-watered, to some extent, at stage 20. The de-watered tailings are delivered along the line 22, which may be a conveyor belt, to a blending stage generally indicated by the numeral 24. The blending stage 24 is provided with a de-watering screen 26 onto which a layer 28 of de-watered tailings is delivered. Thickened underflow is delivered along line 30 and discharged on to the tailings layer 28 creating a layer 32 on the tailings layer 28. The tailings layer 28 and layer 32 are carried along the de-watering screen. During this passage, water from the layers 32 and 28 passes through he de-watering screen 26. The water may be recycled along line 34 to the thickener 10. The blended product consisting of tailings and thickened slimes is discharged at 36 from the de-watering screen and delivered to a discharge or deposition point 38 along line 40. All of these aspects of the blending stage are further illustrated by reference to FIG. 2.

Thus, the invention provides a blend of thickened slimes and tailings at discharge point 36. There will be some mixing of the two components of the blend. The blend consisting of slimes and tailings may be used to fill the original mining excavation. The blended product contains both clay and original sand from the excavation and is thus environmentally friendly. The need for a large area required for a slimes dam is thus minimised. Areas of land covered by slimes dams are difficult to rehabilitate and cannot typically be re-utilised on closure of the mine.

The illustrated embodiment shows a de-watering of the tailings at stage 20 prior to the de-watering stage 24. De-watering of the tailings prior to the de-watering stage 24 is not necessary, but will generally be employed.

The invention has particular application to slimes produced in the recovering of heavy minerals such as ilmenite, rutile and zircon from sands containing such minerals.

Below is set out an example of the application of the invention to a particular slime.

The slimes component can be described as a Non-Newtonian fluid, with the laminar flow behaviour being modelled by the Bingham plastic approximation. This slimes has a maximum slurry density of 1.43 metric tons per cubic meter of 49% (w/w) solids content. This implies that further de-watering will occur when deposited on the bed of tailings.

The de-watering screen deck is fitted with 0.35×12 mm slot aperture panels which prevents the tailings bed from passing through as well as facilitates the drainage rate.

The rate at which tailings is fed onto the de-watering screen is 250 metric tons per hour, at a moisture content average of 19% (w/w). This means that the tailings itself initiates the drainage process before the slimes is deposited onto it. The thickness of the bed of tailings varies between 100 and 150 mm, providing sufficient depth for efficient mixing and drainage. Without the correct bed thickness, the slimes will be carried through the screen deck, and back into the process, which is not the desired effect. When the slimes is deposited onto the bed of tailings, it starts to mix with and de-water through the already draining bed of tailings.

The abovementioned together with the vibrating effect of the screen, enhances the mixing and drainage properties of the bed of tailings. The average drainage rate of the entire bed varies between 6 and 10 cubic meters per hour. The blended product will have a moisture content ranging between 73 and 80% (w/w) and will be suitable for disposal via a conveyor system.

We claim:

1. A method of producing a thickened slimes fraction blended with a tailings fraction for delivery to a discharge or disposal point, the method comprising the steps of:

providing a thickened slimes fraction;

providing a tailings fraction;

forming a bed of the tailings fraction on a de-watering screen;

delivering the thickened slimes fraction onto the bed of tailings fraction; and allowing the slimes fraction to de-water through the bed and the screen.

2. A method according to claim 1, wherein the tailings fraction is de-watered prior to it being introduced onto the de-watering screen.

3. A method according to claim 1 further including the step of carrying the bed of tailings along the de-watering screen with the slimes fraction disposed thereon.

* * * * *